(12) United States Patent
Han et al.

(10) Patent No.: US 11,668,521 B2
(45) Date of Patent: Jun. 6, 2023

(54) REFRIGERATOR AND CLOUD SERVER OF DIAGNOSING CAUSE OF ABNORMAL STATE

(71) Applicant: LG ELECTRONICS INC., Seoul (KR)

(72) Inventors: Junsoo Han, Seoul (KR); Younghun Yang, Seoul (KR); Junsang Yun, Seoul (KR); Cholok Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 774 days.

(21) Appl. No.: 16/488,801

(22) PCT Filed: Jun. 27, 2018

(86) PCT No.: PCT/KR2018/007305
§ 371 (c)(1),
(2) Date: Aug. 26, 2019

(87) PCT Pub. No.: WO2019/182199
PCT Pub. Date: Sep. 26, 2019

(65) Prior Publication Data
US 2021/0356202 A1 Nov. 18, 2021

Related U.S. Application Data

(60) Provisional application No. 62/645,321, filed on Mar. 20, 2018.

(51) Int. Cl.
*F25D 29/00* (2006.01)
*G05B 23/02* (2006.01)
(Continued)

(52) U.S. Cl.
CPC ....... *F25D 29/006* (2013.01); *G05B 23/0259* (2013.01); *F25B 2700/11* (2013.01);
(Continued)

(58) Field of Classification Search
CPC .............. F25D 29/006; F25D 2700/02; F25D 2700/10; F25D 2700/122; F25D 49/005; F25D 2700/11; G05B 23/0259
See application file for complete search history.

(56) References Cited

U.S. PATENT DOCUMENTS 5,860,285 A * 1/1999 Tulpule .................... F24F 11/30
62/127
2007/0156373 A1* 7/2007 Yamashita ............ F25B 49/005
702/182
(Continued)

FOREIGN PATENT DOCUMENTS

CN 2005274059 10/2005
CN 102095207 6/2011
(Continued)

OTHER PUBLICATIONS

JP2005274059 Translation.*
(Continued)

*Primary Examiner* — Brian M King
(74) *Attorney, Agent, or Firm* — Lee Hong Degerman Kang Waimey

(57) ABSTRACT

Provided are a refrigerator and a cloud server that diagnose a cause of an abnormal state. According to an embodiment of the present disclosure, an abnormal state diagnosis unit included in the refrigerator or the cloud server generates information on the abnormal state of the refrigerator based on similarity between stored first group of information and a normal pattern, and a cause diagnosis unit generates, when the abnormal state diagnosis determines that a state of the refrigerator is an abnormal stte, information on cause of the abnormal state based on similarity between stored second group of information and a defect pattern.

11 Claims, 11 Drawing Sheets

(51) Int. Cl.
  *G06Q 10/20* (2023.01)
  *G06Q 30/016* (2023.01)
  *H04L 67/12* (2022.01)

(52) U.S. Cl.
  CPC ...... *F25D 2700/02* (2013.01); *F25D 2700/10* (2013.01); *F25D 2700/122* (2013.01); *G06Q 10/20* (2013.01); *G06Q 30/016* (2013.01); *H04L 67/12* (2013.01)

(56) References Cited

U.S. PATENT DOCUMENTS

| | | | |
|---|---|---|---|
| 2011/0054844 | A1 | 3/2011 | Han et al. |
| 2014/0070951 | A1* | 3/2014 | Shim ............... F25B 49/005 340/585 |
| 2017/0276426 | A1 | 9/2017 | Jung |
| 2018/0244465 | A1* | 8/2018 | Fuleshwar Prasad . G01D 21/00 |

FOREIGN PATENT DOCUMENTS

| | | |
|---|---|---|
| CN | 103261823 | 8/2013 |
| CN | 103914735 | 7/2014 |
| JP | 2005127615 | 5/2005 |
| JP | 4415185 | 10/2005 |
| JP | 2005274059 A * | 10/2005 |
| KR | 100406094 | 11/2003 |
| KR | 20070074863 | 7/2007 |
| KR | 10-2009-0005998 | 1/2009 |
| KR | 101553843 | 2/2011 |
| KR | 1020110097335 | 8/2011 |
| KR | 1020120105234 | 9/2012 |
| KR | 1020170109844 | 10/2017 |
| KR | 10-2018-0003519 | 1/2018 |
| KR | 10-2018-0029543 | 3/2018 |

OTHER PUBLICATIONS

State Intellectual Property Office of the People's Republic of China Application Serial No. 201880018855.3, Office Action dated Nov. 18, 2020, 8 pages.
European Patent Office Application Serial No. 18905898.5, Search Report dated Mar. 24, 2021, 11 pages.
Korean Intellectual Property Office Application No. 10-2020-7023374, Office Action dated Aug. 22, 2022, 11 pages.
Korean Intellectual Property Office Application No. 10-2020-7023374, Notice of Allowance dated Feb. 3, 2023, 7 pages.

* cited by examiner

WEAK COOLING    SUPERCOOLING

_57_

POOR COOLING1   POOR COOLING2   POOR COOLING3

_58_

------ REFERENCE TEMPERATURE OF STABILITY
▬▬ MEASURED TEMPERATURE

REFRIGERATOR AND CLOUD SERVER OF DIAGNOSING CAUSE OF ABNORMAL STATE

CROSS-REFERENCE TO RELATED APPLICATIONS

This application is the National Stage filing under 35 U.S.C. 371 of International Application No. PCT/KR2018/007305, filed on Jun. 27, 2018, which claims the benefit of U.S. Provisional Application No. 62/645,321, filed Mar. 20, 2018, the contents of which are all incorporated by reference herein in their entirety.

TECHNICAL FIELD

A refrigerator and a cloud server of diagnosing a cause of an abnormal state are disclosed herein.

BACKGROUND ART

Electronic products are operated in various environments. Thus, a structure or components of the product may be changed after the product is shipped. For example, when the user frequently turns a TV on and off, a malfunction may occur in a power connection. Further, when an air conditioner comprising an outdoor unit and mechanical/chemical/physical components is operated, an abnormal state may occur during operation of the air conditioner.

Likewise, a refrigerator may be impacted mechanically or electrically as the refrigerator is frequently used and various kinds of abnormal states, such as an abnormal change in the property of a refrigerant or an abnormal change in the operation of a compressor, may occur. As it is difficult to necessarily clearly determine a cause of the abnormal state from an outside, the user may not resolve the abnormal state of the refrigerator and a service representative may visit to a site where the refrigerator is installed and has to resolve the abnormal state of the refrigerator.

Korean Patent No. 10-1215097 discloses a wireless communication device and a wireless communication method of a refrigerator that may provide diagnostic information or state information of the refrigerator through a portable terminal and may transmit and receive user information to and from the portable terminal. FIG. 1 shows a process of transmitting and receiving information between the refrigerator and the portable terminal, which is described in the above-mentioned document.

First, it is determined that a portable terminal receives an information request from the user (S1), and the portable terminal transmits an information request message to the refrigerator (S2). The refrigerator retrieves the requested information (S3) and transmits the retrieved information back to the portable terminal (S4). The portable terminal displays and stores the received information (S5). The steps of FIG. 1 may be performed when the user desires to determine the state of a refrigerator through the portable terminal.

However, as shown in FIG. 1, the state of the refrigerator may only be determined based on basic information of the refrigerator. There is a limitation to the determination of the abnormal state of the refrigerator. FIG. 1 does not show a content of determining the state of the refrigerator as abnormal or normal. However, FIG. 1 shows that information is identified by the portable terminal.

Therefore, FIG. 1 does not suggest how to generally determine an abnormal state of the refrigerator, and does not show how to use the received state information. Accordingly, the method according to FIG. 1 does not transmit the abnormal state of the electronic products such as a TV, an air conditioner, a refrigerator, and the like, to a customer in real time or at predetermined time intervals. Therefore, there is a need for determining the abnormal state of the electronic products such as the refrigerator and diagnosing the cause of the abnormal state to quickly respond to the determined abnormal state.

DISCLOSURE

Technical Problem

The present disclosure solves the above-mentioned problems. The present disclosure provides a device of detecting an abnormal state occurring during operation of a refrigerator before the abnormal state causes failure, and diagnosing a cause of the abnormal state.

According to the present disclosure, a refrigerator or a cloud server precisely diagnoses a determination and a cause of the abnormal state through two steps of learning modules to enhance precision in the diagnosis of the cause of the abnormal state of the refrigerator.

According to the present disclosure, a service center may determine a state of the home appliances based on accumulated sensing information and provide a user with an appropriate customer service even when the user does not accurately explain a state of the refrigerator when the user applies for a customer service.

The objects of the present disclosure are not limited to the above-mentioned objects, and other objects and advantages of the present disclosure which are not mentioned may be understood by the following description and more clearly understood by the embodiments of the present disclosure. It will also be readily understood that the objects and advantages of the invention may be realized by means defined in the appended claims and a combination thereof.

Technical Solution

According to an embodiment of the present disclosure, a refrigerator includes one or more sensors that generate a first group of information on an abnormal state of the refrigerator, one or more sensors that generate a second group of information on a cause of the abnormal state, and a storage unit that stores the first group of information or the second group of information sensed by the sensors in combination with time information.

According to another embodiment of the present disclosure, a cloud server includes a communication unit that receives first group of information on the abnormal state and second group of information on a cause of the abnormal state from a plurality of refrigerators and a storage unit that stores the received information in combination with identification information and time information of the refrigerator.

According to an embodiment of the present disclosure, an abnormal state diagnosis unit included in the refrigerator or the cloud server generates information on the abnormal state of the refrigerator based on similarity between the stored first group of information and a normal pattern.

According to an embodiment of the present disclosure, a cause diagnosis unit included in the refrigerator or the cloud server generates, when the abnormal state diagnosis unit determines the state thereof is the abnormal state, the information on the cause of the abnormal state based on similarity between the stored second group of information and a defect pattern.

According to an embodiment of the present disclosure, the abnormal state diagnosis unit generates the information on the abnormal state of the refrigerator after a predetermined X-time after confirming occurrence of an event by an operation information sensor or a door sensor and inputs the sensed result of the second group of sensor determined as the abnormal state after the X-time to generate the information on the cause of the abnormal state, by the cause diagnosis unit.

According to an embodiment of the present disclosure, the cause diagnosis unit includes two or more defect patterns corresponding to the cause of the abnormal state, and includes an input layer to which second group of information is input, an output layer that generates correlation between information input to the input layer and outputs the similarity to any one of the defect patterns as the information on the cause, and two or more engines of a hidden layer that define the correlation and correspond to the defect patterns, respectively.

Advantageous Effects

When this invention is applied, a device that detects an abnormal state occurring during operation of a refrigerator before the abnormal state causes failure and diagnoses a cause of the abnormal state to resolve the abnormal state may be implemented.

When this invention is applied, the abnormal state is firstly diagnosed based on information on sensing of various sensors indicating a state of the refrigerator, and when the abnormal state occurs, the cause of the abnormal state is precisely diagnosed secondarily to respond to the abnormal state of the refrigerator preemptively.

When this invention is applied, even when the user may not accurately explain the state of the refrigerator during application for customer service, the service center determines the state of the refrigerator based on the accumulated sensing information or the information on the abnormal state or the information on the cause corresponding to the diagnosis result to provide an appropriate customer service.

The effects of the invention are not limited to the effects described above, and those skilled in the art of the present disclosure may easily understand the various effects of the present disclosure based on the disclosure of the present disclosure.

DETAILED DESCRIPTION

Figure 1:
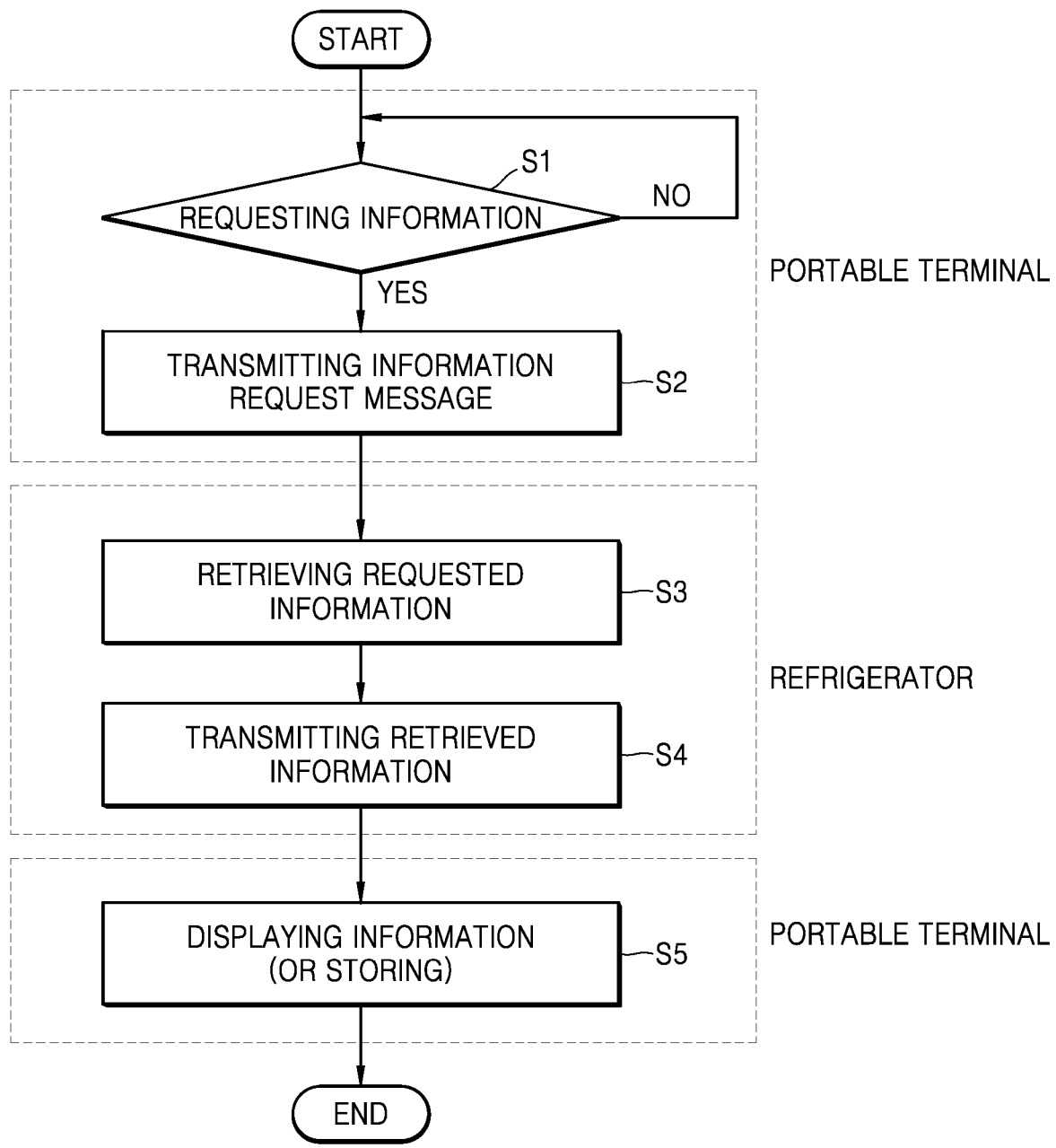
FIG. 1 shows a process of transmitting and receiving information between a refrigerator and a portable terminal, which is presented in the above-mentioned document.

Hereinafter, the embodiment of the present disclosure will be described in detail with reference to the drawings so that those skilled in the art to which the present disclosure pertains may easily perform the present disclosure. The present disclosure may be implemented in many different forms and is not limited to the embodiment described herein.

In order to clearly illustrate the present disclosure, a part that is not related to the description is omitted, and the same or similar components are denoted by the same reference numerals throughout the specification. Further, some embodiments of the present disclosure will be described in detail with reference to exemplary drawings. In adding the reference numerals to the components of each drawing, the same components may have the same sign as possible even when they are displayed on different drawings. Further, in describing the present disclosure, when it is determined that a detailed description of a related known configuration and a function may obscure the gist of the present disclosure. The detailed description thereof will be omitted.

In describing the component of the present disclosure, it is possible to use the terms such as first, second, A, B, (a), (b), and the like These terms are only intended to distinguish a component from another component, and a nature, an order, a sequence, or the number of the corresponding components are not limited by that term. When a component is described as being "connected", "coupled", or "connected" to another component, the component may be directly connected or connected to another component, it is to be understood that another component is "interposed" between components, or each component is "connected", "coupled", or "connected" through another component.

Further, in implementing the present disclosure, for convenience of explanation, the component will be described by being subdivided; however, these components may be implemented in a device or a module, or a component may be implemented by being divided into a plurality of devices or modules.

In the present disclosure, a refrigerator will be described as a main embodiment that enables monitoring an abnormal state of a device. The abnormal state means that the device is not operated normally and does not necessarily mean a failure state of the device. A state before the failure of the device occurs is also included in the abnormal state, and the failure state is included in the abnormal state.

As described above, the refrigerator has a very complex operation state, which means various possibilities of the abnormal states. Thus, a more complex determination of the abnormal state may be required compared to other home appliances. Therefore, according to the embodiment of the present disclosure, the refrigerator will be mainly described. However, the present invention is not limited to the refrigerator, and the present invention is applied to all products that may transmit information on an operation state occurring when a communicable electronic product continuously operates to a cloud server and receive the result of determination of the information on the operation state.

According to the embodiment of the present disclosure, the refrigerator is mainly described as a device that refrigerates or freezes a stored product and includes all types of refrigerating and freezing devices, such as a general refrigerator that stores food, a kimchi refrigerator, a beverage refrigerator, a household refrigerator, a commercial refrigerator, and a freezing device having only a freezer. Further, the present invention is also applied to a device that refrigerates stored goods, other than food, such as a cosmetics refrigerator. Further, a refrigerating device installed in a large refrigerating trailer, which is a portable type rather than a fixed type, is also included in the embodiment described in the present invention.

According to the present disclosure, the refrigerator may collect information on an internal state based on various communication protocols and transmit the collected information to an external cloud server. Alternatively, an internal state may be determined and diagnosed by the refrigerator, and information on the final result of diagnosis or the diagnosis state may be transmitted to the cloud server. In this process, it is possible to communicate based on WiFi as an embodiment of a communication process between the refrigerator and other servers, but the present invention is not limited thereto.

Figure 2:
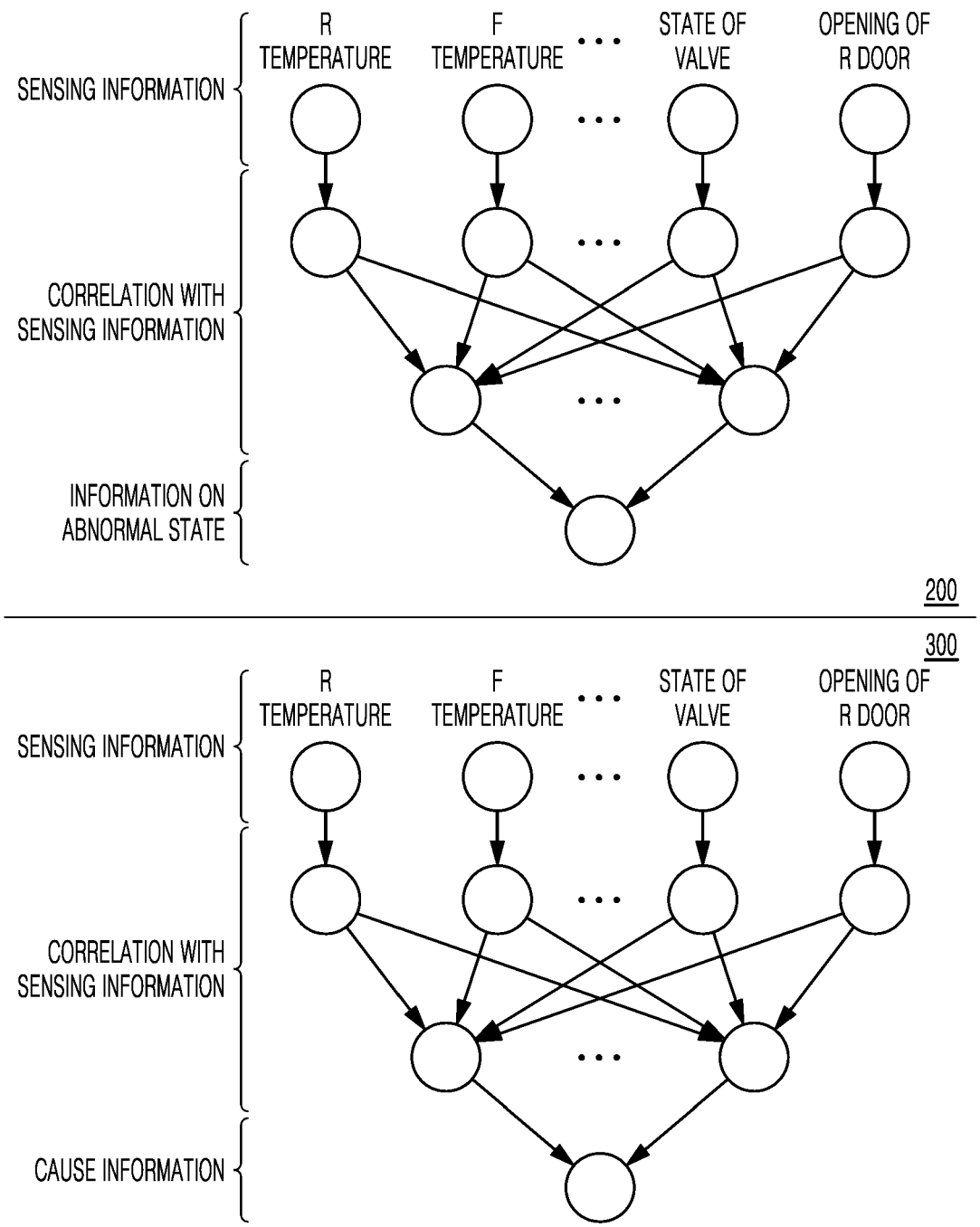
FIG. 2 shows a process of diagnosing an abnormal state and a cause thereof based on information sensed by a refrigerator according to an embodiment of the present disclosure.

FIG. 2 shows a process of diagnosing an abnormal state and a cause of the abnormal state based on sensing information sensed by a refrigerator according to an embodiment of the present disclosure.

An abnormal state diagnosis unit 200 and a cause diagnosis unit 300 that diagnose the abnormal state based on the sensing information may diagnose the abnormal state/normal state of the refrigerator based on the sensing information or may identify the cause of the failure based thereon.

The abnormal state diagnosis unit 200 will be described. Predetermined sensing information is input to the abnormal state diagnosis unit 200. The abnormal state diagnosis unit 200 diagnoses whether a current state of the refrigerator is an abnormal state or a normal state based on the correlation thereof and a pattern of accumulated sensing information. That is, the abnormal state diagnosis unit 200 generates the information on the abnormal state, which may have the following values.

Information on an abnormal state={Normal, Abnormal}

Various sensors may be arranged in the refrigerator, and the information sensed by these sensors may be non-temporal information or may be stored so that a temporal pattern may be identified. In FIG. 2, a temperature of a refrigerating compartment, a temperature of a freezer compartment, a state of a valve, a door opening of the refrigerating compartment, and the like are input as sensing information.

The sensing information sensed in real time or stored sensing information is input to input layers of the abnormal state diagnosis unit 200. The abnormal state diagnosis unit 200 formed a network with respect to a correlation of sensing information by performing learning based on a plurality of normal sensing information and abnormal sensing information.

When the sensing information is input to the input unit of the network including nodes and edges capable of determining the normal pattern of the refrigerator, the abnormal state diagnosis unit 200 outputs the information on the abnormal state based on the sensing information. The output value indicates abnormality or normality. The abnormality or the normality is not necessarily limited to the revealed abnormal state or the normal state, and a state in which defect may occur even before a defect state is determined from the outside thereof may also be included in the abnormal state.

The abnormal state diagnosis unit 200 may determine how much the input sensing information is identical to the normal pattern. The abnormal/normal state may be determined based on whether a value corresponding to the abnormal state deviates a threshold value for the normal pattern or the value corresponding to the abnormal state is included in the threshold value.

As the sensed information that is generated every moment is input at predetermined intervals (for example, at time intervals of one minute), the abnormal state diagnosis unit 200 only determines whether the abnormal state occurs. When the abnormal state does not occur, the sensing information is input so that the operation of the refrigerator may be continuously monitored without the additional operation of the cause diagnosis unit 300.

On the other hand, when the abnormal state occurs, the cause diagnosis unit 300 determines a sensor having a high degree of correlation with the abnormal state, and diagnoses the cause of the abnormal state based on the determined sensor. To this end, the cause diagnosis unit 300 may generate the information on the cause of the abnormal state based on the sensing information and meta information generated based on the sensing information. The cause diagnosis unit 300 has a network with respect to a correlation of sensing information representing a pattern indicating various kinds of causes of defects. When the input sensing information is identical to the pattern of the cause of the defect of the refrigerator, the cause of the abnormal state currently occurring is determined based on the information on the cause of the corresponding pattern. The cause diagnosis unit 300 probabilistically determines the cause of the abnormal state based on the similarity between the patterns indicating various kinds of causes of defect and the input sensing information.

In FIG. 2, two diagnosis units 200 and 300 are provided for the abnormal state, and these diagnostic units may also be included in the refrigerator or may also be included in the cloud server. Alternatively, two diagnosis units 200 and 300 may be distributed to the refrigerator and the cloud server.

In summary, in FIG. 2, the abnormal state diagnosis unit 200 generates two pieces of information on an abnormal state (in a case of occurrence of the abnormality or in a case of normality in which the abnormality does not occur).

On the other hand, the cause diagnosis unit 300 probabilistically generates the similarity with the pattern of cause of defect, for example, the cause diagnosis unit 300 may show one or more causes of the defect such as door opening of the refrigerator (90%) and valve leakage (10%), and may generate the cause of the defect and a probability value thereof as the information on the cause.

As a result, it is possible to take immediate action in response to the cause of the defect. As a method of service response, it is possible to provide a display of the refrigerator with work information to resolve the cause of the defect or to generate work information to set an appointment with service center personnel for visit. Especially, as the method of service response, the monitoring server which is in charge of the customer service may be operated together to execute the service dispatch after providing necessary materials in advance to prevent the defect, and to respond to the defect with remote control service as preemptive response to prevent the defect.

Examples of preemptive response to prevent the defects may include removing the frost in the case of the poor defrosting, and increasing a control temperature of the refrigerating when supercooling is performed in the refrigerating compartment.

FIG. 2 is summarized as follows. Examples of the information generated by various sensors of the refrigerator may include information suitable for determining whether the state of the refrigerator is a normal state or an abnormal state and may include the information suitable for diagnosing the cause of the defect state. Therefore, the abnormal state is firstly diagnosed based on the information, and when the state of the refrigerator is the abnormal state, the cause thereof is secondarily diagnosed.

In FIG. 2, the abnormal state diagnosis unit 200 and the cause diagnosis unit 300 may be implemented separately. Further, these separate components may be implemented within a refrigerator or a server.

However, as these components are learned through deep learning, the sensing information may be provided based on the big data during learning. The cause diagnosis unit 300 may be implemented as one unit, but may be divided into various parts according to various kinds of causes. For example, a first cause diagnosis unit may include a deep learning engine that diagnoses the cause of the power cooling, and a second cause diagnosis unit may include an engine of diagnosing the cause of abnormality in temperature.

According to the embodiment of the present disclosure, it may be classified into a case in which both the abnormal state diagnosis unit 200 and the cause diagnosis unit 300 are implemented within the refrigerator and a case in which the abnormal state diagnosis unit 200 and the cause diagnosis unit 300 are both implemented within the server, and a case in which the abnormal state diagnosis unit 200 may be implemented within a refrigerator and the cause diagnosis unit 300 may be implemented within a server. However, this classification does not provide a difference in the configuration of the abnormal state diagnosis unit 200 and the cause diagnosis unit 300.

Of course, the abnormal state diagnosis unit 200 may be implemented within the server, and the cause diagnosis unit 300 may be implemented within the refrigerator. However, as the abnormal state diagnosis unit 200 may require a small magnitude of computing power than that of the cause diagnosis unit 300, the person skilled in the art may implement the abnormal state diagnosis unit 200 and the cause diagnosis unit 300 within the refrigerator and the server, respectively, in consideration of the above.

Hereinafter, the learning process of the abnormal state diagnosis unit and the cause diagnosis unit will be described. The abnormal state diagnosis unit and the cause diagnosis unit create a deep learning engine based on learning data generated by various types of refrigerators.

Figure 3:
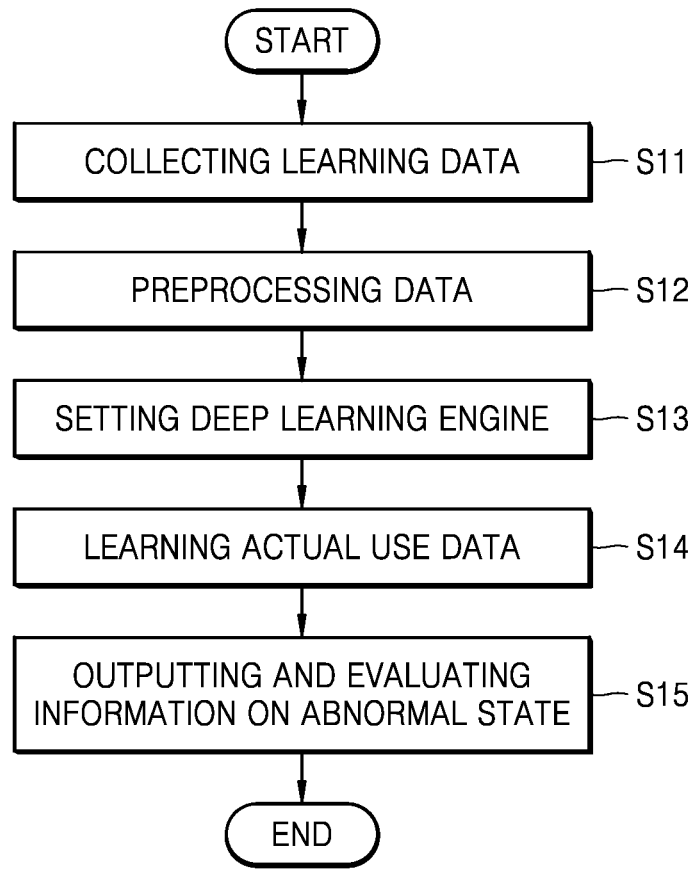
FIG. 3 shows a process of learning of an abnormal state diagnosis unit according to an embodiment of the present disclosure.

FIG. 3 shows a process of learning an abnormal state diagnosis unit according to an embodiment of the present disclosure.

Learning data is collected for forming big data, and the learning data is for various normal and abnormal states generated by various types of refrigerators (S11). Examples of the data collected therefrom include field data in consideration of conditions of actual use such as RT related to a temperature, humidity, load, and door opening and closing, and learning data classified into normal defrosting/load response.

As the collected data is generated by various types of refrigerators, the pre-processing is performed so that learning may be made by performing standardization or normalization (S12). Further, a characteristic value necessary for each refrigerating/freezer compartment is extracted.

Thereafter, a deep learning engine is set (S13). The deep learning engine is arranged in the abnormal state diagnosis unit 200, and performing an initial setting required for performing the deep learning based on the above-mentioned data is included in S13. Thereafter, the learning is performed using the actual use data (S14), and outputting and evaluating the information on the abnormal state (S15) is repeated to perform the deep learning.

When the learning is repeated based on the big data of sufficient size, the abnormal state diagnosis unit 200 may generate the information on the abnormal state indicating whether the state is the abnormal state based on the similarity with the normal pattern using the input sensor data.

In order to perform the deep learning, collecting data on normality and abnormality of the refrigerator according to various environmental conditions and use patterns is preceded.

In the case of FIG. 3, information that distinguishes the normality/the abnormality may also be input. For example, the data on normality has to include information on a normal stable operation, a defrosting operation to remove frost and ice of a cooler, and an operation of a load response that is generated by inserting food. In the case of the data on the defect, it needs to acquire data by simulating defect due to a cause thereof. Examples of environmental parameters include outside air temperature, outside air humidity, an installation site, and the like. Parameters related to the use pattern, for example, door opening and closing, an amount of inserted food, a temperature setting, and the like are provided as learning data.

Further, the collected learning data may include parameters such as a temperature sensor of the refrigerator (a temperature sensor in the refrigerator/a defrost temperature sensor/an outside air temperature sensor), an operation state of components (a state of a 3-way valve, an operation or not of a fan, rpm of a fan), opening and closing of the door (the door opening of the refrigerating compartment and the door opening of the freezer compartment), an operation state of a compressor (stroke, phase, cooling power, and the like), and power of the compressor. Before setting the deep learning based engine, it is possible to extract valid parameters for diagnosis and to perform preprocessing through normalization to adjust a level of each parameter.

After preprocessing, a deep learning based engine that is suitable for analyzing/learning time series data to diagnose the normality and the defect is designed, and a necessary characteristic value may be derived by learning the actual use data. Likewise, a model of diagnosing a cause of failure based on deep learning suitable for determining various kinds of causes also derives the necessary characteristic values through learning of data on the abnormality.

Figure 4:
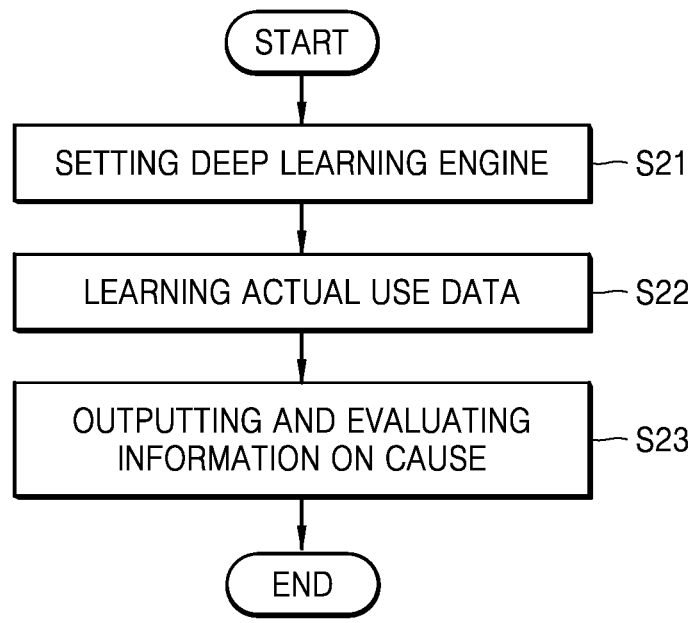
FIG. 4 shows a process of learning a cause diagnosis unit according to an embodiment of the present disclosure.

FIG. 4 shows a process of learning a cause diagnosis unit according to an embodiment of the present disclosure.

The information on the abnormal state generated as shown in FIG. 3 is set as an input value, and data of S11 and S12 are used as data. The deep learning engine is set to be suitable for the cause diagnosis unit (S21). The deep learning engine is arranged in the cause diagnosis unit 300 and performing an initial setting required for performing the deep learning based on the above-mentioned data is included in S21.

As described above, the deep learning engine shown in FIG. 3 is set to optimally distinguish the normal/abnormal state based on the provided data. On the other hand, the setting of the deep learning engine of FIG. 4 may be different from the setting of FIG. 3 as it may generate various kinds of states of causes based on the input data.

Thereafter, the learning is performed using the actual use data (S22), and outputting and evaluating the information on the cause (S23) is repeated to perform the deep learning. When the learning is repeated using the big data of sufficient size, the cause diagnosis unit 300 may generate the information on the cause indicating the cause of the defect based on the input sensor data.

The deep learning of FIG. 3 is performed to be suitable for determining the abnormal state by inputting all sensor data without distinguishing the normality/abnormality, while the deep learning of FIG. 4 is performed to diagnose the cause thereof by inputting the sensor data when the abnormal state is determined. Thus, the deep learning of FIG. 3 is different from that of FIG. 4.

As shown in FIGS. 3 and 4, the abnormal state diagnosis unit 200 and the cause diagnosis unit 300 including the learned deep learning module may be implemented and distributed in a form of software or hardware. It may perform the upgrade through software upgrade or replacement of hardware module.

The abnormal state diagnosis unit 200 and the cause diagnosis unit 300 may operate based on different groups of information, respectively. For example, the abnormal state diagnosis unit 200 may generate information on the abnormal state of the refrigerator based on similarity between the first group of information generated by the sensors of the refrigerator and the normal pattern. The cause diagnosis unit 300 may generate the information on the cause of the abnormal state based on the similarity between the second group of information generated by the sensors of the refrigerator and the defect pattern.

According to an embodiment, the first group and the second group may be the same, but may be different from each other. For example, a union of a set of sensors that generate the first group of information and a set of sensors that generate the second group of information may include at least one of a temperature sensor that senses the temperature of the refrigerating compartment and the freezer compartment, a temperature sensor of an evaporator of the refrigerating compartment and a freezer compartment, a defrost sensor that senses a defrost cycle and a defrosting state of the refrigerating compartment and the freezer compartment, a door sensor that senses the opening and closing of the door, a sensor of a compressor that senses an operation pattern of the compressor, and a fan sensor that senses an operation pattern of a fan, and a valve sensor that senses the state of the valve. Alternatively, the information may be the information generated by these sensors.

Alternatively, a sensor that is included in the first group and is not included in the second group may be provided and may include at least one of a deep cool sensor related to an operation of quick freezing of the freezer compartment, a door sensor that senses the opening and closing of the door of the freezer compartment and the refrigerating compartment, a load response sensor that indicates a load response of the refrigerating compartment and the freezer compartment, and a defrost sensor that senses a defrost cycle and a defrost state of the refrigerating compartment and the freezer compartment. Alternatively, the information may be the information generated by these sensors.

Alternatively, a sensor included in the second group and not included in the first group may include at least one of a temperature sensor of an evaporator of a refrigerating compartment or a freezer compartment, a temperature sensor of a freezer compartment or a refrigerating compartment, a sensor that senses an operation state of a refrigerator, and a sensor of a compressor that senses on-off or cooling power of the compressor or an operation pattern of the compressor. Alternatively, the information may be the information generated by these sensors.

Figure 5:
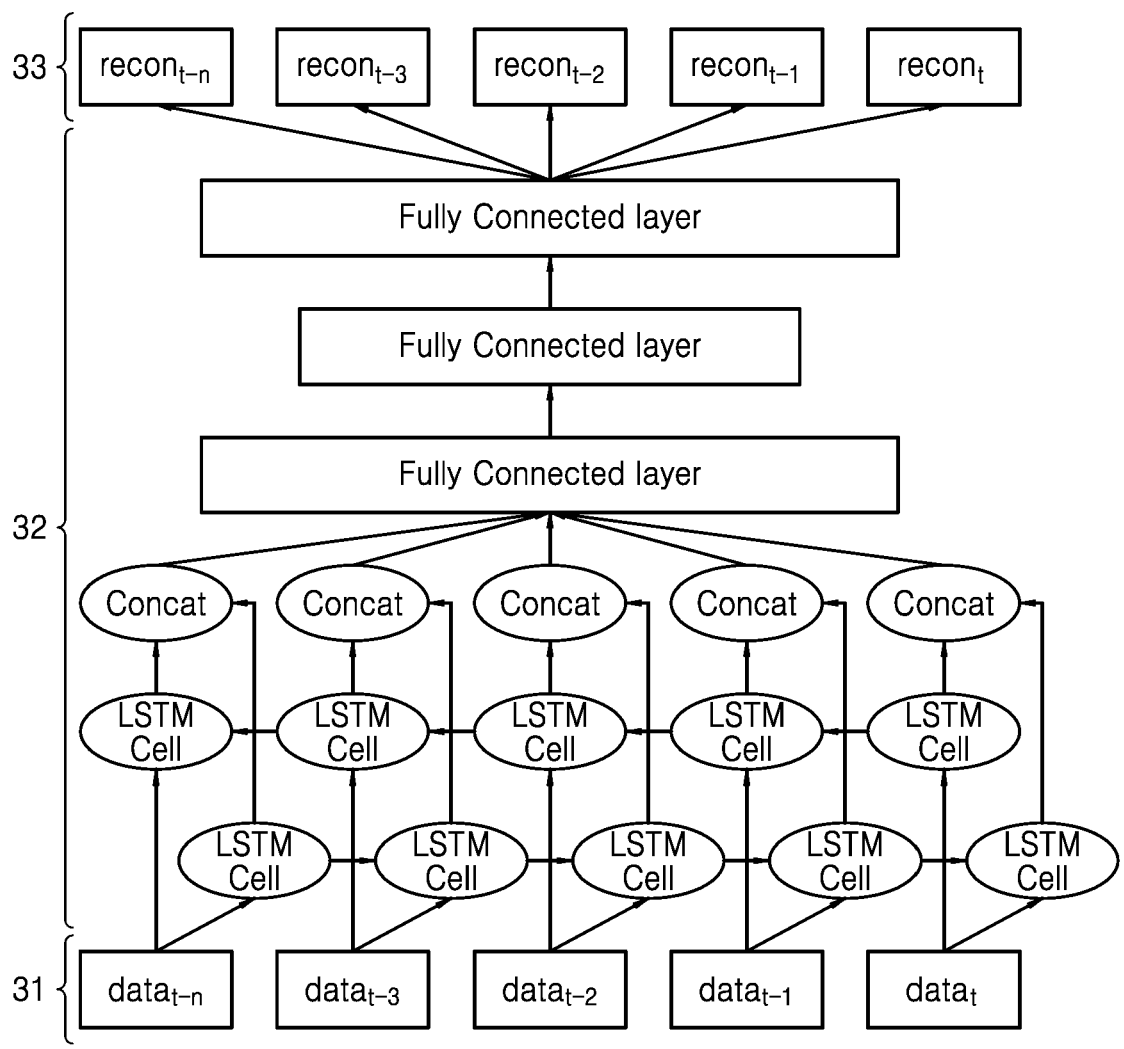
FIG. 5 shows a configuration of a deep learning module of an abnormal state diagnostic unit according to an embodiment of the present disclosure.

FIG. 5 shows a configuration of a deep learning module of an abnormal state diagnostic unit according to an embodiment of the present disclosure. FIG. 5 shows an embodiment in which a learning network is formed based on long short term memory models (LSTM), but the present disclosure is not limited thereto. The LSTM solves a problem of long-term dependency of the input information to limit propagation time in the network.

In FIG. 5, an input layer 31 of data input to the deep learning module is input as parameters during data transmission and calculation between various nodes (LTSM cell and contact) included in a hidden layer 32 in the deep learning module. Further, the result generated by the nodes of the hidden layer 32 that defines a correlation between the input layer 31 and the output layer 33 is input to one or more fully-connected layers (FC layers) and an output layer 33 outputs data finally. These output data is included in information on the abnormal state which is a result of determining a normal/abnormal state.

In FIG. 5, information on the abnormal state may be divided into "normality" and "abnormality" simply, and a result of subdivision of the abnormal state such as "abnormality in temperature", "abnormality in cooling", and "abnormality in door" for each node of each output layer 33 may be output. Of course, two or more abnormal states may combine. Alternatively, the information on the abnormal state may be generated based on one of the abnormal states corresponding to the most likely output data.

The first group of information is input to the input layer 31 of the abnormal state diagnosis unit 200 of FIG. 5. Further, the correlation between information input to the input layer 31 is generated and the information on the abnormal state is output by the output layer 33.

As shown in FIG. 5, based on the flow suggested in FIG. 3, the data on the normality is learned, and depending on how closely the data matches the normal pattern, and when there is a peak blow a threshold a defect generated when a value deviates from a normal threshold value, that is an abnormal state is diagnosed. This will be described in detail with reference to FIG. 6.

Figure 6:
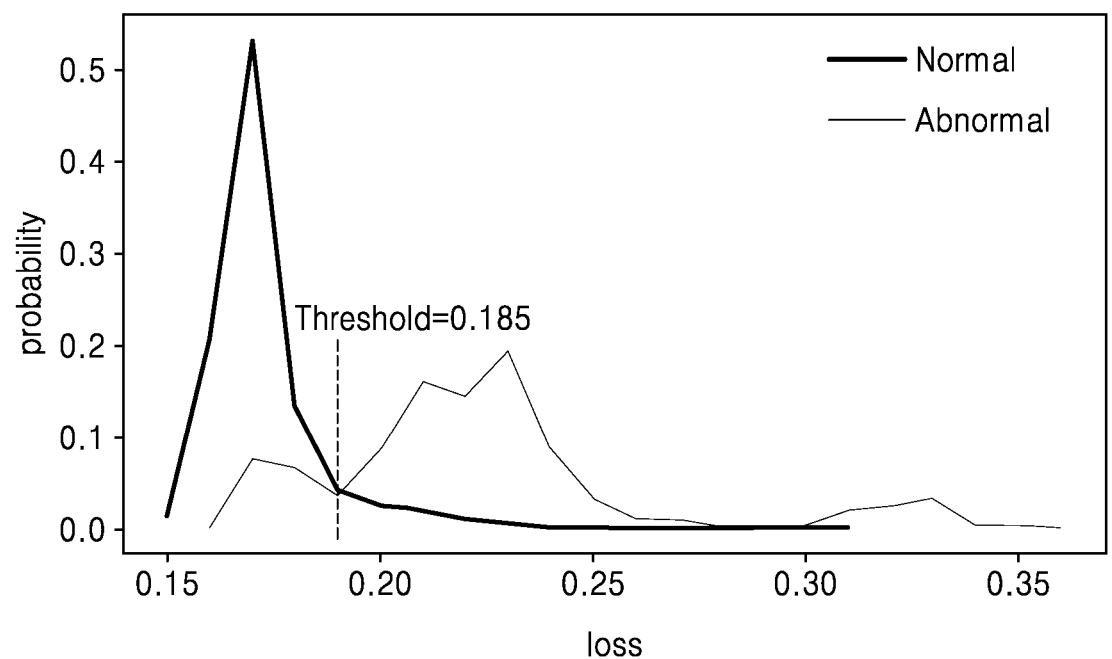
FIG. 6 is a graph of determination of abnormal states according to an embodiment of the present disclosure.

FIG. 6 is a graph of determination of an abnormal state according to an embodiment of the present disclosure. FIG. 6 shows a configuration of determining normality by a threshold based on a loss rate in a case of matching with a normal pattern. It is possible to determine abnormality (an abnormal state) or a normal state based on a reference of 0.185 in a matching with an abnormal case and in a matching with a normal case.

Figure 7:
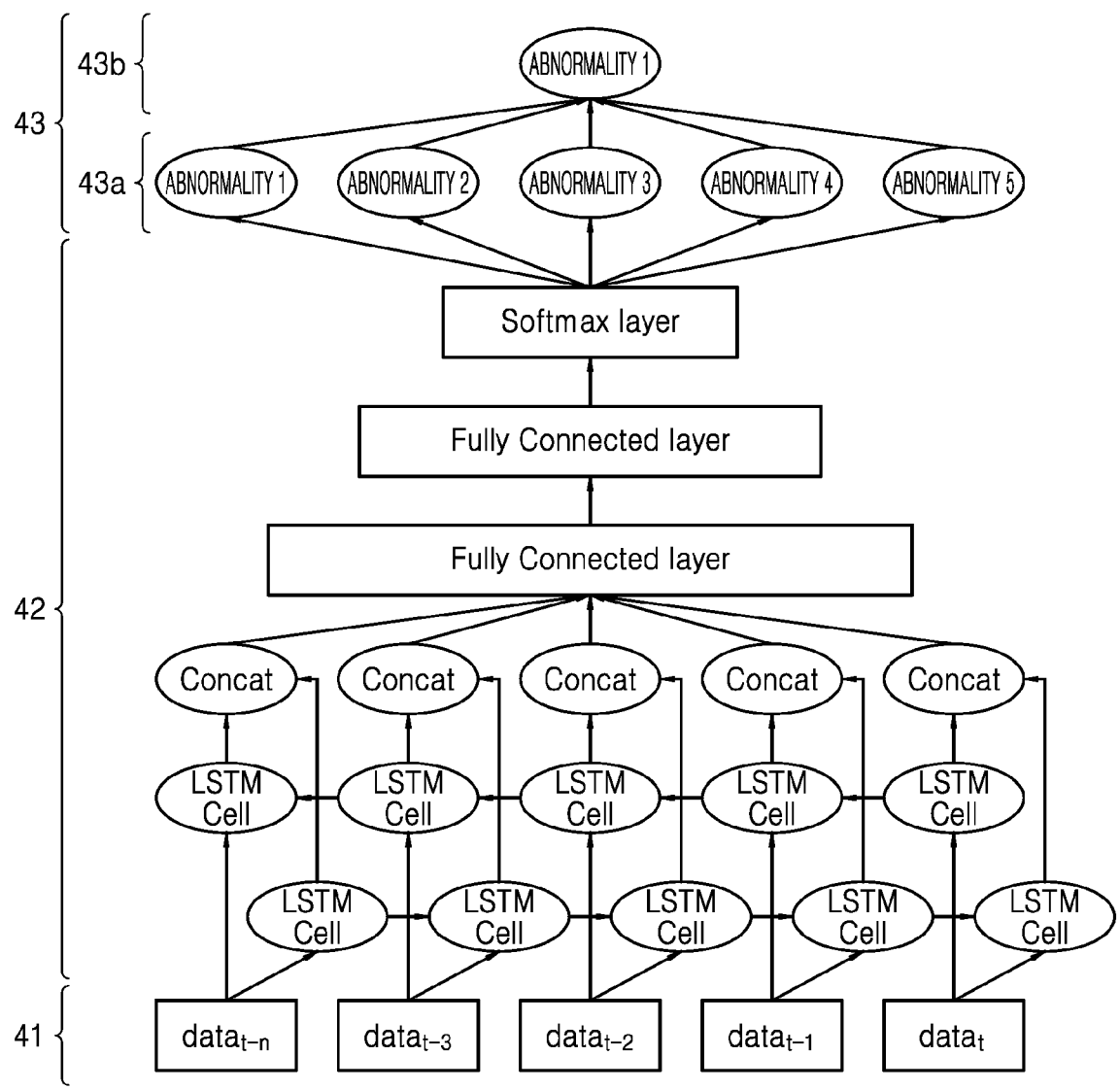
FIG. 7 shows a configuration of a deep learning module of a cause diagnosis unit according to an embodiment of the present disclosure.

FIG. 7 shows a configuration of a deep learning module of a cause diagnosis unit according to an embodiment of the present disclosure.

A cause diagnosis unit 300 includes a deep learning module to identify a cause of an abnormal state. FIG. 7 shows an embodiment in which a learning network is formed based on the LSTM as shown in FIG. 5, but the present disclosure is not limited.

As shown in FIG. 7, the data input to the input layer 41 in the deep learning module is input as parameters during data transmission and calculation between various nodes (a LSTM cell and contact) in a hidden layer 42 included in the deep learning module. Further, the results generated from these nodes are input to one or more fully-connected layers (FC layers) and a softmax layer, and is finally output by an output data 43.

The hidden layer 42 may have a form of an engine, and one of the plurality of hidden layers 42 may be selected. In more detail, the cause diagnosis unit 300 may include two or more defect patterns corresponding to the cause of the abnormal state, and may include a plurality of engines of the hidden layer corresponding to these defect patterns, so that a specific engine of the hidden layer may be selected according to the defect pattern.

In other words, the second group of information is input to the input layer 41, and the output layer 43 generates the correlation of the information input to the input layer 41 to output similarity with any one of the defect patterns as information on the cause. The engine of the hidden layer defines the correlation and corresponds to each of the defect patterns.

As a result, like as in reference numeral 43a, it is possible to output a plurality of abnormal results by the output layers, and the cause diagnosis unit 300 may generate the cause of the abnormality with a highest probability or complexity.

The soft max layer allows the input values to be normalized when the input value is output so that their sum reaches a certain value (for example, 1). This may increase accuracy of determining the cause thereof by making a probability of the cause thereof to be a specific upper limit value (for example, 1) or less when various kinds of causes are derived in the determination of the cause thereof.

These output data may output a specific state of cause, which indicates that a certain area is in the abnormal state and this is the cause of the abnormal state. That is, the information on the cause has a structure in which a plurality of abnormality-related information on the cause 43a are firstly provided, and then information on the cause 43b which is a result of collection thereof is generated.

FIG. 7 shows an embodiment of a cause diagnosis unit with respect to abnormality in temperature. That is, it is possible to diagnose a cause having the most similar pattern characteristic among a plurality of causes. Further, when the temperature of the device is identical to or greater than a threshold value, it is possible to diagnose the cause of a redundancy of the defect. This may be confirmed through a method of outputting information on a plurality of causes of abnormality in reference numeral 43a.

The data of the refrigerator used for the determination in FIGS. 5 to 7 is transmitted at specific intervals, for example, at intervals of one minute, and during the diagnosis of the abnormality or the diagnosis of the cause, the diagnosis may be performed through time series analysis of pattern based on data collected in a predetermined size (for example, data of a unit of two hours).

To this end, by accumulating data having a predetermined size or more, and firstly determining the abnormal state as shown in FIG. 5 based on the data, when the abnormal state occurs, the data at this time point, the data collected before at this time point, and the data generated by the corresponding refrigerator after this time point are input to the cause diagnosis unit 300 to determine the cause of the abnormal state.

Figure 8:
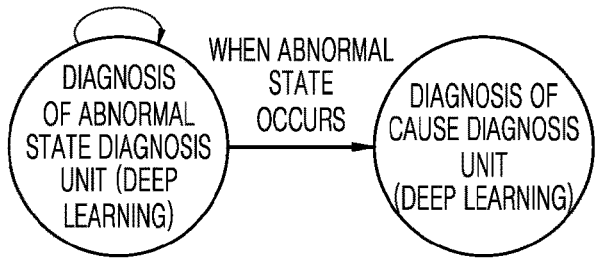
FIG. 8 shows a diagnostic mechanism to diagnose an abnormal state and cause of the abnormal state according to an embodiment of the present disclosure.
Figure 8:
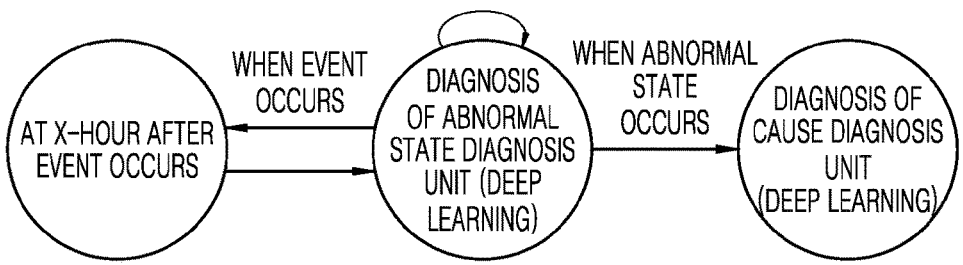
Figure 8:
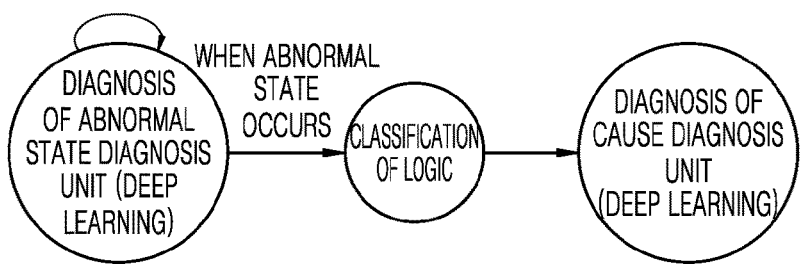
Figure 8:
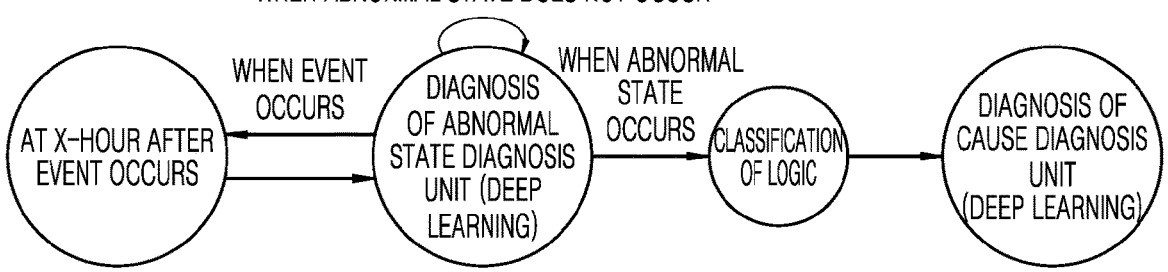

FIG. 8 shows a diagnostic mechanism to diagnose an abnormal state and cause thereof according to an embodiment of the present disclosure. FIG. 8 provides four types of mechanisms. Four methods may be used to increase accuracy of diagnosis, for example, diagnosis of normality/abnormality and a cause of the abnormality and to reduce load in calculation in the determination of an engine that diagnoses the defect.

Reference numeral 51 is a first mechanism, that is, a first case, which is a process of diagnosis only by a deep learning method. An abnormal state diagnosis unit 200 diagnoses whether an abnormal state has continuously occurred based on the data generated by the refrigerator through the deep learning. When the abnormal state occurs (generating information on the abnormal state), the cause diagnosis unit 300 diagnoses the cause based on the deep learning (generating the information on the cause). When the abnormal state does not occur, the abnormal state diagnosis unit 200 continuously performs the diagnosis.

Reference numeral 52 is a second mechanism, that is, a second case, which diagnoses whether the state is an abnormal state or a normal state, by the abnormal sate diagnosis unit 200, after a predetermined time (X-time) after an event occurs. As a temperature of the refrigerator rises from a time point at which the event occurs (door opening, performing a load response, performing defrosting, and the like) to a transitional section, a logic of an operation for quick cooling is changed. Therefore, it is possible to improve a disadvantage of degrading the accuracy in the diagnosis with respect to the transition section and increasing a calculation load through the diagnosis of deep learning in real time using the deep learning-based diagnosis after X-time and determining the state.

When the abnormal state has occurred (generating information on the abnormal state), the cause diagnosis unit 300 diagnoses the cause based on the deep learning (generating the information on the cause). When the abnormal state does not occur, the abnormal state diagnosis unit 200 continuously performs the diagnosis. Further, when the event occurs during the diagnosis, the abnormal state diagnosis unit 200 diagnoses the abnormal state after predetermined time.

The event means that the user takes action with respect to the refrigerator, and the door opening and closing occurs. Further, when performing a particular operation (performing defrosting, loading, and the like) in the refrigerator also corresponds to an event. When these events occur, the operation of the refrigerator is not stabilized for a predetermined period of time, so that it is possible to diagnose the abnormal state after a predetermined time (after X-time) to determine whether the abnormal state has occurred.

Reference numeral 53 is a third mechanism and is the same as reference numeral 51, but a process of diagnosing the cause of reference numeral 53 is different from that of reference numeral 51. As a temperature pattern is simple, for example, the temperature is increased or decreased during diagnosis of the cause of abnormality, reference numeral 53 uses a diagnosis method through cross check by adding logic which may represent a characteristic of an item of defect to increase the accuracy thereof. For example, a feature in which a difference between a temperature of the freezer compartment and a temperature of a defrost sensor of the freezer compartment is increased when the freezer compartment is slightly opened and a case in which a probability of slightly opening the door of the freezer compartment is 50% or more when the abnormality is diagnosed based on the deep learning are diagnosed as a slight opening of the door of the freezer compartment.

That is, when the abnormal state occurs, the logic is classified according to the abnormal state. Classification of logic may be used to finally generate the information on the cause based on the result of diagnosing the characteristics thereof by logic based on a type of abnormality in the temperature such as weak cooling, supercooling, poor cooling, and the result of performing the diagnosis of the cause diagnosis unit 300. The classification of logic may be used to accurately diagnose the cause thereof, by the cause diagnosis unit, by having different items that may be diagnosed according to categories of the abnormal states, for example, supercooling/weak cooling/poor cooling.

Reference numeral 54 is a combination of the second mechanism and the third mechanism.

Table 1 shows a classification of logic according to an embodiment of the present disclosure.

TABLE 1

| Diagnostic item | Defect phenomenon | Cause of occurrence of defect | Feature of data on defect phenomenon |
|---|---|---|---|
| Defect of 3-way Valve | Supercooling of the refrigerating compartment Weak cooling of the freezer compartment | Defect of a valve (defect caused by a device or a foreign matter) | A temperature of a defrost sensor in a refrigerating compartment falls below zero under operating conditions of a freezer compartment. A temperature sensor of the refrigerating chamber has dropped to below zero (the freezing of food inside the refrigerating compartment is performed). If operation time of the freezer compartment becomes longer and the temperature of the freezer compartment is increased if worse (weak cooling in the freezer compartment is performed). |
|  | Poor cooling | Misconnection of Harness | A temperature of a defrost sensor of the refrigerating compartment and a freezer compartment rises. |
| Clogging of a cycle (welding) | Poor cooling in the refrigerating compartment Poor cooling in the freezer compartment Poor cooling in the refrigerating/ freezer compartment | Poor welding Clogging due to foreign matter/particle in the cycle | The temperatures of the sensor in the refrigerator and the defrost sensor rise at the same time after the clogging occurs (poor cooling) As the refrigerant does not flow, there is almost no difference in temperature between the defrost sensor and the sensor in the refrigerator $\to \Delta T = 5°$ C. in average normal operation, and $\Delta T = 1°$ C. in case of occurrence of clogging. |
| Cycle clogged (moisture) | Poor cooling of the freezer compartment | Freezing due to moisture penetration | The sensor of the freezer compartment and the defrost sensor of the freezer compartment are cooled once, and likewise the clogging phenomenon, the temperature thereof rises in a state in which there is no difference in temperature between the sensor of the freezer compartment and the defrost sensor of the freezer compartment, and as the rise in temperature is stopped about 0° C., the temperature thereof is cooled. |
| Slight opening of door (Freezer compartment) | Weak cooling of the freezer compartment Poor cooling (Blockage of an evaporator) | Slight opening due to interference with food and interference with a structure inside of the refrigerator Door opening due to a defect of a gasket | After the door is opened, a distance between the frost sensor of the freezer compartment and the sensor of the freezer compartment starts increasing. Thereafter, the temperature of the defrost sensor of the freezer compartment drops and the temperature of the refrigerating sensor rises continuously. |
| Slight opening of door (refrigerating compartment) | Supercooling of the refrigerating compartment (weak cooling when the door is excessively opened) | Slight opening due to interference with food and interference with a structure in a refrigerator door opening due to defect of a gasket | After the door is opened, the temperature of the defrost sensor of the refrigerating compartment drops and the temperature of the sensor of the refrigerating compartment drops to below zero. Then, when the temperature of the defrost sensor of the refrigerating compartment drops and the temperature of the |

TABLE 1-continued

| Diagnostic item | Defect phenomenon | Cause of occurrence of defect | Feature of data on defect phenomenon |
|---|---|---|---|
| | | | refrigerating sensor rises when this state is maintained during a long period of time. |
| Covering the sensor of the refrigerating compartment and covering an outlet at an upper end of the refrigerating compartment | Supercooling in the refrigerating compartment | When the sensor in the refrigerating compartment is completely covered and is completely covered with food around the sensor, and when an outlet at an upper end of the refrigerating compartment is completely covered with food | Operation time of the refrigerating compartment is longer and the temperature of the defrost sensor is significantly reduced (under conditions of RT of 25° C., in normal, the temperature of the defrost sensor is within 10° C., and in the case of defect, temperature of the defrost sensor drops to about −15° C.). |
| Refrigerant shortage | Weak cooling in the refrigerating compartment/freezer compartment Poor cooling | Insufficient amount of filled refrigerant | It takes a long time to cool down to an initial satisfaction temperature (in a case of a level of 60% of a proper amount of refrigerant, a cooling rate of the refrigerating compartment is reduced by two times or more, and a cooling rate of the freezer compartment is reduced by three times or more) When the refrigerant is significantly insufficient, the temperature is not satisfied (40% or less of an appropriate amount of refrigerant) |
| Refrigerant leakage | Poor cooling in the refrigerating compartment/freezer compartment | Leakage of a welding part (a machine room and an evaporator) Leakage of piping due to vibration or corrosion | [A machine room of a refrigerator in the case of leakage of high-pressure portion] The pressure of the compressor is suddenly lowered and the temperature of the defrost sensor and temperature sensor continuously rises. [a cooler of a refrigerator, in the case of leakage of a low pressure portion] The pressure of the compressor rises twice or more and the temperature of the defrost and temperature sensors continuously rises after a few hours. |
| Poor defrosting | Weak cooling/ poor cooling | Slight opening due to interference with food and interference with a structure inside of a refrigerator. Door opening due to a defect of a gasket. Frequent door opening and closing under high humidity conditions in summer | After the door is opened, the distance between the defrost sensor of the freezer compartment and the sensor of the freezer compartment starts increasing. Thereafter, the temperature of the defrost sensor of the freezer compartment is continuously dropped and the temperature of the freeze sensor continuously rises. |

As shown in Table 1, the diagnosis may be performed by total nine items of diagnosing abnormality in temperature. Nine items provide relevant diagnostic items to diagnose the cause thereof based on information on abnormality classified as supercooling/weak cooling/poor cooling described above. The diagnostic items as shown in Table 1 may be used when the logic is classified or when any one of a plurality of cause diagnosis units are selected. Alternatively, a list of related diagnostic items from the data input to the cause diagnosis unit may be input.

It is possible to diagnose the supercooling of the refrigerating compartment and the weak cooling of the freezer compartment due to the defect of the 3-way valve, poor cooling due to the clogging caused by welding of a cycle, a poor cooling due to clogging of the cycle due to moisture, supercooling of the refrigerating compartment or poor cooling of the refrigerating compartment due to the slight opening of the door of the refrigerating compartment, the weak cooling of the freezer compartment or the poor cooling of the freezer compartment due to the slight opening of the door of the freezer compartment, supercooling of the refrigerating compartment due to covering the sensor of the refrigerating compartment or covering the outlet at the upper end thereof, weak cooling due to the shortage of the refrigerant, poor cooling due to the leakage of the refrigerant, or weak cooling or the poor cooling due to the poor defrosting.

FIG. 8 shows that the sensors that generate the first group of information, in reference numerals 52 and 54 that an event occurs in the diagnosis of the abnormality, includes at least one of an operation information sensor required to determine an operation state of the load response or a defrosting state of the refrigerator or a door sensor that senses opening and closing of the door.

The abnormal state diagnosis unit 200 may generate the information on the abnormal state of the refrigerator after the predetermined X-time after the occurrence of the event is determined by the operation information sensor or the door sensor. Then, after X-time, the result sensed by the second group of sensors determined to be in the abnormal state may be input to the cause diagnosis unit 300 so that the cause diagnosis unit 300 may generate the information on the cause of the abnormal state.

Figure 9:
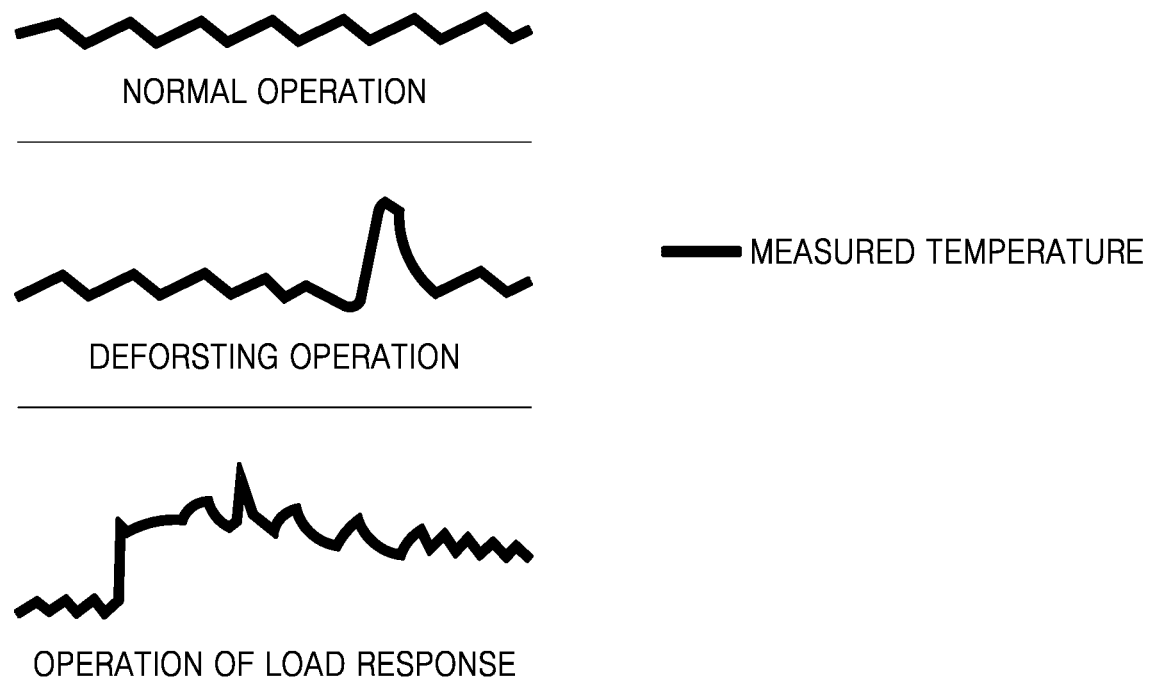
FIG. 9 shows a temperature pattern according to an embodiment of the present disclosure.

FIG. 9 shows temperature patterns according to an embodiment of the present disclosure. FIG. 9 shows changes in temperature sensed by a sensor in a refrigerator and normal patterns. The temperature change in a normal operation, the temperature change in a defrosting operation, and the temperature change in an operation of load response may be confirmed in FIG. 9. When one of the patterns shown in FIG. 9 is input as changes in temperature, an abnormal state diagnosis unit 200 determines that a state of the refrigerator is a normal state.

Figure 10:
FIG. 10 shows a temperature pattern according to an embodiment of the present disclosure.
Figure 10:
Figure 10:
Figure 10:
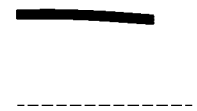

FIG. 10 shows temperature patterns according to an embodiment of the present disclosure. FIG. 10 shows changes in temperature sensed by a sensor in a refrigerator and abnormal patterns.

A pattern of weak cooling and a pattern of supercooling are provided in reference numeral 57 based on a reference temperature of stability. A pattern in the case of poor cooling is shown in reference numeral 58. When relation between the measured temperature and the reference temperature of stability is applied to Table 1, the diagnostic items required for diagnosing the cause may be selected, and a cause diagnosis unit 300 may more accurately generate information on the cause based thereon.

Further, the pattern may be used to determine the relation with the cause. For example, the pattern of weak cooling of reference numeral 57 may be related to the cause of slight opening of a door, and the pattern of supercooling of reference numeral 57 may be related to a defect of a valve or a cause of the clogging of an outlet.

Likewise, poor cooling 1 of reference numeral 58 may be related to a cause of refrigerant leakage and poor cooling 2 may be related to a cause of clogging due to moisture, and poor cooling 3 may be related to a cause of clogging caused by welding or refrigerant shortage. Information on diagnostic items indicated by or corresponding to these patterns may be input to the cause diagnosis unit 300. Alternatively, the cause diagnosis unit 300 suitable for the diagnostic item may be selected.

When one of the patterns of FIG. 10 is input as changes in temperature, an abnormal state diagnosis unit 200 determines that a state of the refrigerator is an abnormal state. Further, logic may be classified according to the temperature change pattern, and the cause diagnosis unit 300 corresponding thereto may be selected. That is, the cause diagnosis unit 300 determines the defect pattern described in FIG. 10 based on the first group of information and selects an engine of a hidden layer corresponding to the defect pattern. It is possible to generate the information on the cause corresponding to the defect pattern based on the selected engine of the hidden layer.

Figure 11:
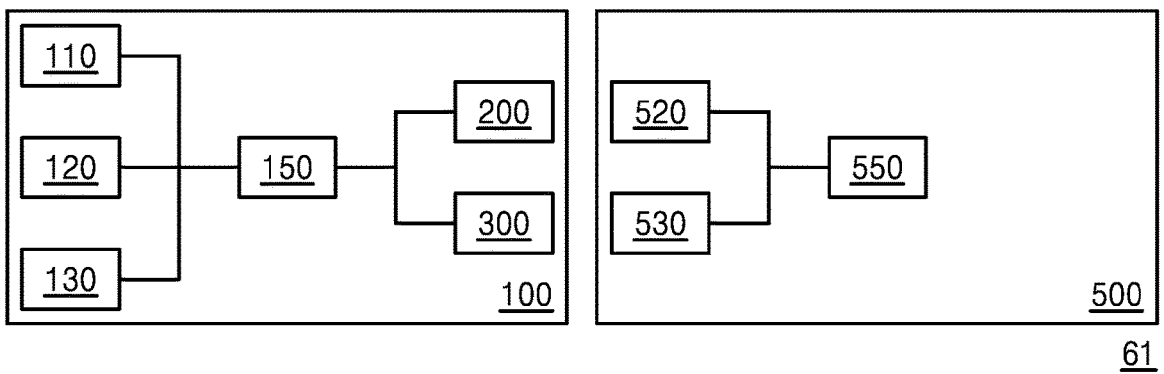
FIG. 11 shows a configuration in which an abnormal state diagnosis unit and a cause diagnosis unit are arranged.
Figure 11:
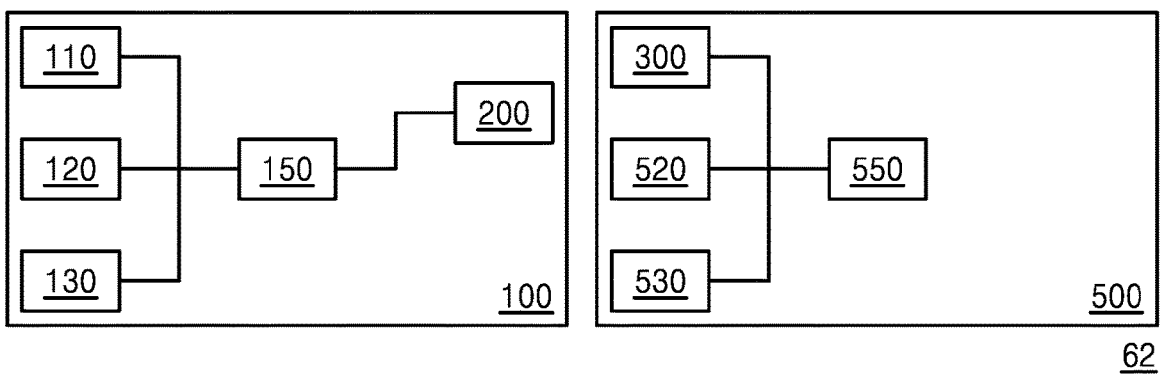
Figure 11:
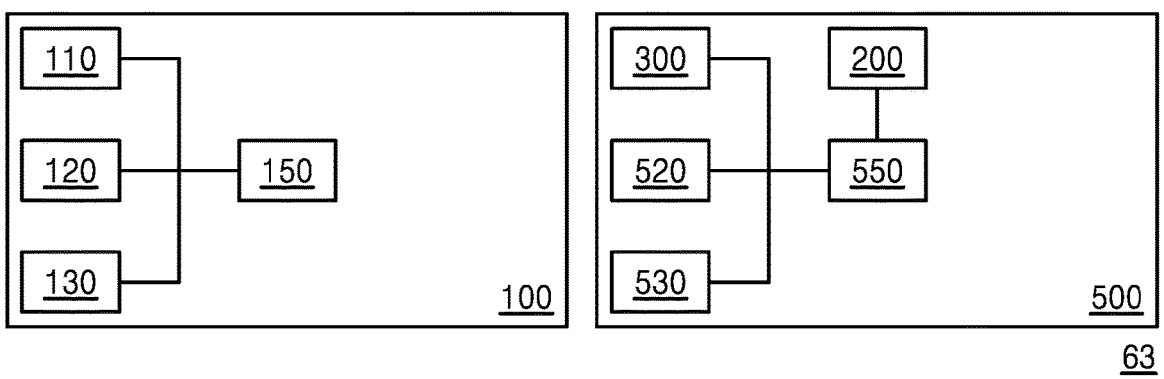

FIG. 11 shows a configuration that an abnormal state diagnosis unit and a cause diagnosis unit are arranged. Reference numeral 61 is an embodiment in which an abnormal state diagnosis unit 200 and a cause diagnosis unit 300 are arranged in a refrigerator 100. Reference numeral 62 is an embodiment in which an abnormal state diagnosis unit 200 is arranged in a refrigerator 100 and a cause diagnosis unit 300 is arranged in a cloud server 500, and reference numeral 63 is a configuration in which an abnormal state diagnosis unit 200 and a cause diagnosis unit 300 are arranged in a cloud server 500.

Common components included in a refrigerator 100 of reference numerals 61 to 63 are a sensor 110, a storage unit 120, a communication unit 130, and a control unit 150. Common components included in a cloud server 500 of reference numerals 61 to 63 are a storage unit 520, a communication unit 530, and a control unit 550. Each of these components will be described.

The sensor 110 includes a sensor that generates a first group of information corresponding to an abnormal state of the refrigerator and a sensor that generates second group of information corresponding to the cause of the abnormal state.

The storage unit 120 stores the first group of information or the second group of information, which are sensed by the sensors, in combination with time information.

The communication unit 130 transmits at least one of sensor information (information sensed by the sensors) generated by the refrigerator 100 or information in combination with time information or information on an abnormal state or information on the cause to a cloud server 500. Further, it is possible to receive work information from the cloud server 500 or a monitoring server (not shown) separated from the server. The control unit 150 controls the communication unit 130 to control the reception of work information and output the received work information to a separate display device.

The work information includes information required to resolve the abnormal state. That is, information on customer service schedule or the optimum setting information required to resolve the abnormal state generated based on the information on the cause is an embodiment of the work information.

Customer service schedule includes a schedule for a representative to visit an installation site and resolve the abnormal state. Further, the schedule promised to resolve the abnormal state remotely also belongs to the customer service schedule.

The optimum setting information means information that the user of the refrigerator 100 may set to resolve the abnormal state. For example, when the temperature of the refrigerator is wrongly set (set too low or set too high), a guidance message to inform the user to adjust the temperature or information that enables activating an optimum setting are included in the optimum setting information.

The control unit 150 controls a plurality of components included in the refrigerator 100. In addition to embodiments of reference numerals 61 to 63, the refrigerator 100 further includes components such as a compressor, an evaporator, and a compressor for refrigerating and freezing functions, in addition to a refrigerator and a freezer. However, as these are general components of the components of the refrigerator, the description thereof is omitted.

The abnormal state diagnosis unit 200 generates information on the abnormal state of the refrigerator based on similarity between the first group of information stored in the storage unit 120 or 520 and a normal pattern. An embodiment of the similarity with the normal pattern is the pattern shown in FIG. 9.

When the cause state diagnosis unit 200 determines that the state thereof is the abnormal state, the cause diagnosis unit 300 generates the information on the cause of the abnormal state based on the similarity between the stored second group of information and the defect pattern. One embodiment of the defect pattern is the patterns shown in FIG. 10.

In an embodiment of reference numeral 62, the communication unit 130 of the refrigerator transmits the stored second group of information to the cloud server 500 when the abnormal state diagnosis unit 200 determines that the state of the refrigerator is the abnormal state.

In an embodiment of reference numeral 63, the communication unit 130 of the refrigerator transmits the first group of information and the second group of information to the cloud server 500 based on request or transmission schedule of the cloud server 500.

The information generated by the sensor 110 of the refrigerator 100 is summarized as follows. Of course, various pieces of information may be included. Information on a temperature of a sensor of a freezer compartment, a control temperature of a freezer compartment, a temperature of a defrost sensor of a freezer compartment, a temperature of a sensor of a refrigerating compartment, a control temperature of a refrigerating compartment, a temperature of a defrost sensor of a refrigerating compartment, an outside air temperature of a sensor, outside air humidity of a sensor, an operation state of a fan of a refrigerating compartment, rpm of a fan of a refrigerating compartment, an operation state of fan of a freezer compartment, rpm of fan of a freezer compartment, an operation state of a fan of a machine room, rpm of fan of a machine room, an operation state of comp, cooling power of comp, an operation state of a 3-way valve, a position of a 3-way valve, an operation state of defrosting of a refrigerating compartment, an operation state of defrosting of a freezer compartment, an operation state of a first start-up after defrosting, a state of a door of a refrigerating compartment, a state of a door of a freezer compartment, a state of a load response of a refrigerating compartment is an embodiment. In addition, power of the comp, stroke of the comp, phase of the comp, current of the comp, frequency of the comp provided by the comp may be information generated by the sensor 100.

The cloud server 500 may operate based on the first group of information on the abnormal state and the second group of information on the cause of the abnormal state received from a plurality of refrigerators, at a communication unit 530. For example, like reference numeral 63, when the abnormal state diagnosis unit 200 and the cause diagnosis unit 300 are both included, the cloud server 500 continuously receives variously sensed information from the refrigerator continuously and stores the received information in combination of identification information and time information of the refrigerator in the storage 520. The first group of information includes specific sensing information, and the second group of information also includes specific sensing information. The first group and the second group may be different from each other.

The control unit of the cloud server 500 also controls the respective components. Further, it also generates work information required by the refrigerator based on the information on the cause.

Then, the communication unit 530 directly transmits the work information to the refrigerator, or transmits the information on the cause to the monitoring server so that the monitoring server may transmit the work information to the refrigerator. The cause diagnosis unit 300 may be arranged in the cloud server 500 (reference numeral 62), or both the abnormal state diagnosis unit 200 and the cause diagnosis unit 300 may be arranged in the cloud server 500 (reference numeral 63). Of course, as shown in reference numeral in 61, the abnormal state diagnosis unit 200 and the cause diagnosis unit 300 are all arranged in the refrigerator 100, and the cloud server 500 may receive at least one of the information on the abnormal state or the information on the cause, so that it is possible to generate work information required for the refrigerator 100 based on the received information.

In the three embodiments of FIG. 11, the set of sensors that generate the first group of information and the set of sensors that generate the second group of information may be the same or different from each other. The union of two sets, that is, the sensors that contribute to generating the information on the abnormal state or the information on the cause based on the information output to any one of the abnormal state diagnosis unit 200 or the cause diagnosis unit 300.

Examples of the sensors may include a temperature sensor that senses temperatures of the refrigerating compartment and the freezer compartment, a temperature sensor of an evaporator of the refrigerating compartment and the freezer compartment, a defrost sensor that senses a defrost cycle and a state of defrosting of refrigerating compartment and the freezer compartment, a door sensor that senses opening and closing of a door, a sensor of a compressor that senses an operation pattern of the compressor, and a sensor of a fan that senses an operation pattern of the fan, and a valve sensor that senses a state of a valve.

Figure 12:
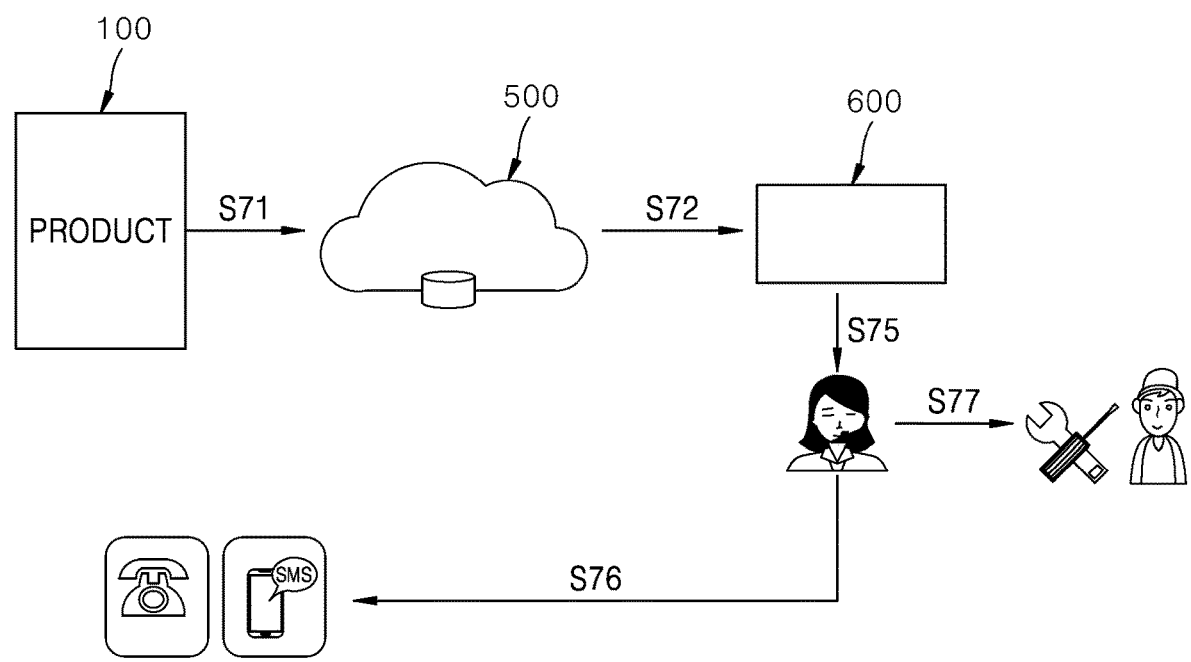
FIG. 12 shows a process in which work information is transmitted and received among a refrigerator, a cloud server, and a monitoring server according to an embodiment of the present disclosure.

FIG. 12 shows a process in which work information is transmitted and received among a refrigerator, a cloud server, and a monitoring server according to an embodiment of the present disclosure.

A refrigerator 100 transmits operation information on monitoring of components or information on sensing of components at predetermined time intervals (for example, in units of seconds or minutes), or information on an abnormal state or information on the cause generated by the refrigerator 100 by itself to a cloud server 500 (S71).

Monitoring of the components may be performed in a variety of ways, for example, by checking an opening and closing of a door, changes in temperature and humidity, circulation of refrigerant, and an operation of a compressor. The transmission may be performed via Wi-Fi exemplified in S71.

Meanwhile, the cloud server 500 compares and analyzes the received information with past information of the product.

For example, as shown in reference numeral 61 of FIG. 11, when the refrigerator 100 transmits the information on the cause, the information on the cause is transmitted to the monitoring server 400 of a call center (S72). Alternatively, as shown in reference numeral 62 of FIG. 11, when the refrigerator 100 transmits the information on the abnormal state and the sensed information, the cloud server 500 inputs the received information to the cause diagnosis unit 300, and generates the information on the cause, and transmits the information on the cause to the monitoring server 400 of the call center (S72).

Meanwhile, as shown in reference numeral 63 of FIG. 11, when the refrigerator 100 transmits the sensed information, the cloud server 500 inputs the received information to the abnormal state diagnosis unit 200 and the cause diagnosis unit 300 and generates the information on the cause finally, and transmits the information on the cause to the monitoring server 600 of the call center (S72).

The cloud server 500 may determine the abnormal state of a product and the cause thereof based on the received data and other comparison data or the previous data of the product. When the abnormality of the product is found, the information on the product and matters of the abnormal state, that is, the information on the cause, are transmitted to the monitoring server 600 of the call center.

The monitoring server 600 of the call center may identify whether an abnormal state such as a previous step in which a device operates or a problem may occur based on the information provided by the cloud server 500. When the abnormal state occurs, the monitoring server 600 controls a notification message to be transmitted to a monitoring representative (S75).

The monitoring representative calls or sends a message to a contact number of an owner of the device and notifies the owner of the device of a method of resolving the abnormal state (S76) or may transmit the information to a customer service (after service) representative to repair the device (S77). S76 and S77 may be performed simultaneously to adjust a visit schedule of the owner of the device and the customer service representative. The information generated in S76 or S77 may be output through a display component of the refrigerator 100 as work information.

When the embodiments of the present disclosure are applied, it is possible to determine the abnormal state by various sensors when the abnormal state generated by the refrigerator, for example, the abnormal state such as abnormality in temperature may occur or before the abnormal state occurs, or before the user recognizes the abnormal state. Further, it is possible to generate the information on the cause of the abnormal state based on the information on the abnormal state.

In order to diagnose the cause of the defect, as shown in FIGS. 5 to 7, the information on the abnormal state is firstly generated based on the deep learning, and then the information on the cause of the abnormal state is secondarily generated to improve the accuracy of diagnosing the cause. Then, a flow, such as contacting the customer service representative or providing a material for repair proceeds based on the flow as shown in FIG. 12 to take action against the defect with respect to the generated information on the cause.

Particularly, when additional repair is not required, as shown in S76, the work information is provided to the user so that the user may quickly respond to a problem situation. As a result, it is possible to prevent erroneous use that cases the abnormal state and cope with the abnormal state in advance.

In particular, it is possible to service the refrigerator at once through preliminary diagnosis of the cause of the abnormal state which may frequently occur in the refrigerator, for example, the abnormality in temperature, and keep food in the refrigerator fresh. The material to resolve the abnormal state is provided and service time is shortened through the preliminary diagnosis of cause, so that both users and manufacturers may improve their temporal and monetary resources.

Furthermore, even though all the components that are included in the embodiment of the present disclosure are described as being coupled to one or operate by being coupled, the present disclosure is not necessarily limited to such an embodiment, and all the components may operate by being selectively coupled to one or more thereof in the object range of the present disclosure. Further, although all of the components may be implemented as an independent hardware, respectively, some or all of each of the components may be selectively combined to be implemented as a computer program that has a program module that performs some or all of the function combined in one or a plurality of hardware. The codes and the code segments that form the computer program will be easily deduced by those skilled in the art of the present disclosure. Such a computer program may be stored in a computer readable media that a computer may read, and may be read and implemented by the computer to implement the embodiment of the present disclosure. Examples of the storage medium of the computer program may include a storage media including a semiconductor recording element, an optical recording media, and a magnetic recording media. Further, a computer program that implements the embodiment of the present disclosure may include a program module that is transmitted in real time via an external device.

Although the embodiment of the present disclosure is mainly described hereinabove, various changes and modifications may be made within the level of those skilled in the art. Thus, unless such changes and modifications do not deviate the scope of the present disclosure, it will be understood that they are included in the scope of the present disclosure.

DESCRIPTION OF REFERENCE NUMERALS

100: Refrigerator
200: Abnormal state diagnosis unit
300: Cause diagnosis unit
500: Cloud server
600: Monitoring server

What is claimed is:

1. A refrigerator comprising:
one or more first sensors that generate a first group of information on an abnormal state of the refrigerator;
one or more second sensors that generate a second group of information on a cause of the abnormal state;
a storage that stores the first group of information or the second group of information in combination with time information;
an abnormal state diagnosis device that generates information on the abnormal state of the refrigerator based on similarity between the stored first group of information and a normal pattern;
a cause diagnosis device that generates the information on the cause of the abnormal state based on similarity between the stored second group of information and a defect pattern when the abnormal state diagnosis device determines that a state of the refrigerator is the abnormal state;
a transceiver that transmits the information on the abnormal state or information on the cause respectively generated by the abnormal state diagnosis device or the cause diagnosis device to a cloud server or a monitoring server of a call center; and a controller configured to control the one or more first sensors and the one or more second sensors, the storage, the abnormal state diagnosis device, the cause diagnosis device, and the transceiver, and to control the transceiver to receive work information via the cloud server or the monitoring server, wherein the cause diagnosis device comprises two or more defect patterns corresponding to the cause of the abnormal state, wherein the cause diagnosis device comprises:
  an input layer to which the second group of information is input;
  an output layer that generates a correlation between information input to the input layer and outputs similarity with any one of the defect patterns as the information on the cause; and
wherein two or more engines of a hidden layer that define the correlation and correspond to each of the defect patterns.

2. The refrigerator of claim 1,
wherein the one or more first sensors and the one or more second sensors comprise at least one of:
  a temperature sensor that senses a temperature of a refrigerating compartment and a freezer compartment,
  a temperature sensor of an evaporator of the refrigerating compartment or the freezer compartment,
  a defrost sensor that senses a defrost cycle and a defrost state of the refrigerating compartment and the freezer compartment,
  a door sensor that senses opening and closing of the door,
  a sensor of a compressor that senses an operation pattern of the compressor,
  a sensor of a fan that senses an operation pattern of the fan, or
  a valve sensor that senses a state of the valve.

3. The refrigerator claim 1, wherein the one or more first sensors comprise at least one of:
  a deep cool sensor related to a quick freezing operation of the freezer compartment,
  a door sensor that senses an opening and closing of a door of the freezer compartment and the refrigerating compartment,
  a load response sensor that indicates a load response of the refrigerating compartment or the freezer compartment, or
  a defrost sensor that senses a defrost cycle and a defrost state of the refrigerating compartment or the freezer compartment.

4. The refrigerator of claim 1, wherein the one or more second sensors comprise at least one of:
  a temperature sensor of an evaporator of a refrigerating compartment or a freezer compartment,
  a temperature sensor of the freezer compartment or the refrigerating compartment,
  a sensor that senses an operation state of the refrigerator, or
  a sensor of a compressor that senses on-off or cooling power of the compressor or an operation pattern of the compressor.

5. The refrigerator of claim 1,
wherein the abnormal state diagnosis device comprises:
  an input layer to which the first group of information is input;
  an output layer that generates a correlation between information input to the input layer and outputs the information on the abnormal state; and
  a hidden layer that defines the correlation.

6. The refrigerator of claim 1,
wherein the one or more first sensors comprise at least one of:
  an operation information sensor required for determining an operation state of load response or a defrosting state of the refrigerator, or
  a door sensor that senses opening and closing of a door,
wherein the abnormal state diagnosis device generates the information on the abnormal state of the refrigerator after a predetermined X-time after confirming occurrence of an operation event, a door opening event or a door closing event by the operation information sensor or the door sensor, and
wherein the cause diagnosis device generates the information on the cause of the abnormal state after the X-time by inputting a sensed result, of the one or more second sensors determined to be in the abnormal state, to the cause diagnosis device.

7. The refrigerator of claim 1,
wherein the refrigerator is configured to transmit the information on the abnormal state or the information on the cause to the cloud server.

8. The refrigerator of claim 7,
wherein the cloud server is configured to compare and analyze the information on the abnormal state or the information on the cause with past information related the refrigerator, and transmit the information on the cause to the monitoring server of the call center.

9. The refrigerator of claim 8,
wherein the monitoring server is configured to transmit a notification message related to the information on the cause to a monitoring representative.

10. The refrigerator of claim 9,
wherein the controller is configured to control the transceiver to control the reception of the work information and output the received work information to a separate display device.

11. The refrigerator of claim 10,
wherein the work information includes information on a customer service schedule or optimum setting information required to resolve the abnormal state generated based on the information on the cause.

* * * * *